(12) United States Patent
Hayashi et al.

(10) Patent No.: US 7,797,936 B2
(45) Date of Patent: Sep. 21, 2010

(54) EXHAUST TURBO SUPERCHARGER

(75) Inventors: Noriyuki Hayashi, Nagasaki (JP); Yasuaki Jinnai, Kanagawa (JP); Seiichi Ibaraki, Nagasaki (JP); Fumiharu Takahashi, Nagasaki (JP); Yoh Akiyama, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 290 days.

(21) Appl. No.: 11/989,306

(22) PCT Filed: Feb. 9, 2007

(86) PCT No.: PCT/JP2007/052389

§ 371 (c)(1),
(2), (4) Date: Mar. 10, 2008

(87) PCT Pub. No.: WO2008/062567

PCT Pub. Date: May 29, 2008

(65) Prior Publication Data

US 2009/0151348 A1    Jun. 18, 2009

(30) Foreign Application Priority Data

Nov. 20, 2006   (JP)   ............... 2006-312801

(51) Int. Cl.
*F02D 23/00*   (2006.01)
*F02B 39/00*   (2006.01)
*F01D 25/24*   (2006.01)
*F16B 35/04*   (2006.01)
*F16B 39/04*   (2006.01)

(52) U.S. Cl. ............... 60/602; 415/213.1; 415/214.1; 415/175; 415/177; 415/178; 415/144; 415/145; 411/395

(58) Field of Classification Search ............ 60/602; 415/213.1, 214.1, 175, 177–178, 144–145; 411/395
See application file for complete search history.

(56) References Cited

U.S. PATENT DOCUMENTS 4,302,149 A * 11/1981 Smale ............... 415/134

(Continued)

FOREIGN PATENT DOCUMENTS

JP    62-029724    2/1987

(Continued)

*Primary Examiner*—Thomas E Denion
*Assistant Examiner*—Mary A Davis
(74) *Attorney, Agent, or Firm*—Wenderoth, Lind & Ponack, L.L.P.

(57) ABSTRACT

An exhaust turbo supercharger is provided that is able to effectively prevent exhaust gas that has flowed into between a turbine housing and a bearing housing from leaking to outside of the device, while allowing an excellent level of workability in assembly and disassembly. Included is a turbine housing, into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; and a bearing housing which is connected to the turbine housing and inside of which the bearing is housed. A bolt insert hole is formed in the turbine housing, and an internal thread insert made from a heat insulating material is provided in the bolt insert hole, and the turbine housing and the bearing housing are fixed by a bolt that engages with the internal thread insert.

9 Claims, 9 Drawing Sheets

U.S. PATENT DOCUMENTS

| | | | | |
|---|---|---|---|---|
| 4,786,238 A * | 11/1988 | Glaser et al. | | 415/175 |
| 5,855,460 A * | 1/1999 | Brehmer et al. | | 411/395 |
| 6,338,614 B1 * | 1/2002 | LaRue | | 417/407 |
| 7,037,065 B2 * | 5/2006 | Reigl | | 403/337 |
| 7,367,190 B2 * | 5/2008 | Shibui et al. | | 60/608 |
| 7,631,497 B2 * | 12/2009 | Panek | | 60/605.1 |
| 2003/0077143 A1 * | 4/2003 | Smolarek | | 411/161 |
| 2003/0106982 A1 * | 6/2003 | Battig et al. | | 248/678 |
| 2009/0169366 A1 * | 7/2009 | Petitjean et al. | | 415/145 |

FOREIGN PATENT DOCUMENTS

| | | |
|---|---|---|
| JP | 05-171948 | 7/1993 |
| JP | 07-189722 | 7/1995 |
| JP | 07-189723 | 7/1995 |
| JP | 07189723 A * | 7/1995 |
| JP | 11-125120 | 5/1999 |
| JP | 11-229886 | 8/1999 |
| JP | 2004-156592 | 6/2004 |
| JP | 2005-207194 | 8/2005 |

* cited by examiner

EXHAUST TURBO SUPERCHARGER

BACKGROUND OF THE INVENTION

I. Technical Field

The present invention relates to an exhaust turbo supercharger to be used in an internal combustion engine that serves as a power source in a vessel, motor vehicle or power generator, in particular, to a VG (variable geometry) type exhaust turbo supercharger.

II. Description of the Related Art

An exhaust turbo supercharger improves the combustion efficiency of an internal combustion engine by forcefully supplying air into a combustion chamber of the internal combustion engine to improve the output of the internal combustion engine and improve the properties of exhaust gas of the internal combustion engine.

As such an exhaust turbo supercharger, a variable displacement type exhaust turbo supercharger disclosed in Japanese Unexamined Patent Application, Publication No. 2004-156592 is known for example.

This variable displacement type exhaust turbo supercharger has a turbine housing (turbine casing), inside of which there is formed a spiral flow passage, and a turbine wheel provided substantially in the center in the radial direction of this turbine housing. Exhaust gas from an internal combustion engine is supplied into the spiral flow passage of the turbine housing. The turbine wheel is rotably driven by exhaust gas supplied into this spiral flow passage.

Moreover, this variable displacement type exhaust turbo supercharger has a compressor housing, inside of which there is formed a spiral flow passage, and a compressor wheel provided in a substantially radial direction center of the compressor housing. The compressor wheel is rotably driven to take outside air into the compressor housing and deliver the outside air that has been taken in into the spiral flow passage in the compressor housing. The spiral flow passage of the compressor is connected to an air intake system of the internal combustion engine. Accordingly, the outside air that has been delivered into this spiral flow passage by the compressor wheel is forcefully delivered to the air intake system of the internal combustion engine.

The turbine wheel and the compressor wheel are linked by a turbine shaft. A bearing housing is provided between the turbine housing and the compressor housing. In the bearing housing, there is provided a bearing that supports the turbine shaft, allowing it to rotate around the axis.

In the bearing housing, on the outer circumference section of an end to be connected with the turbine housing, there is provided a flange section. In the turbine housing, on an end to be connected with the bearing housing, there is formed a plurality of screw holes on the outside of the area that receives the flange section of the bearing housing. The bearing housing and the turbine housing are connected by engaging a bolt in each of the screw holes provided in the turbine housing. Specifically, the bearing housing is fixed on the turbine housing by the flange section of the bearing housing being pressed against the turbine housing by the head sections of the bolts that engage with each of the screw holes of the turbine housing, or by washers attached to the bolt head sections.

Moreover, between the turbine housing and the bearing housing, there is provided a gasket that prevents exhaust gas that has flowed through an insert section of the turbine shaft between the turbine housing and the bearing housing from leaking to outside of the device. The contact pressure contact pressure of this gasket with the turbine housing and the bearing housing is determined by the fastening force of the bolts.

In this variable displacement type exhaust turbo supercharger, exhaust gas introduced from an exhaust system of the internal combustion engine into the spiral flow passage in the turbine housing rotation-drives the turbine wheel.

As the turbine wheel is rotably driven in this manner, this driving force is transmitted to the compressor wheel via the turbine shaft, and the compressor wheel is thereby rotably driven.

Thus, the compressor wheel takes outside air into the compressor housing and delivers the outside air that has been taken into the spiral flow passage in the compressor housing. As a result, the outside air that has been taken into the compressor housing is forcefully supplied into a combustion chamber of the internal combustion engine.

Furthermore, in this variable displacement type exhaust turbo supercharger, in the turbine housing, there is provided a variable nozzle mechanism for adjusting the displacement of the turbine.

The variable nozzle mechanism has nozzle vanes arranged on the inner circumference side of the spiral flow passage in the turbine housing in a plurality of positions at equal intervals in the circumferential direction of the turbine. Each of the nozzle vanes is provided so as to be able to respectively change the blade angle thereof with respect to a nozzle mount attached to the turbine housing.

The variable nozzle mechanism is to adjust a flow speed of exhaust gas delivered from the spiral flow passage into the turbine housing by adjusting the blade angle of each of the nozzle vanes. In the variable nozzle mechanism, by adjusting the flow speed of exhaust gas delivered to the turbine wheel in this manner, the rotation speed of the turbine wheel is adjusted, and the volume of air delivered to the air intake system by the compressor wheel can be adjusted.

SUMMARY OF THE INVENTION

While operating the variable displacement type exhaust turbo supercharger, the turbine housing reaches a high temperature as it receives heat of the exhaust gas traveling inside. Moreover, since the thread face of the bolt that engages with the screw hole of the turbine housing is in surface contact with the turbine housing, the temperature of this bolt becomes high.

On the other hand, in the bearing housing, usually there is provided a lubrication mechanism that supplies lubricating oil to the bearing to lubricate and cool the bearing. The bearing housing is cooled down by lubricating oil supplied from the lubrication mechanism and a temperature rise therein is unlikely to occur compared to the turbine housing.

Therefore, the thermal expansion amount of the bearing housing as a result of operating the variable displacement type exhaust turbo supercharger is smaller than the thermal expansion amount of the turbine housing and the bolt. Accordingly, while operating the variable displacement type exhaust turbo supercharger, the fastening force of the bolt for fastening the turbine housing and the bearing housing decreases, and the contact pressure of the gasket decreases.

Conventionally, in order to sufficiently ensure the contact pressure of the gasket even during operation of the variable displacement type exhaust turbo supercharger, in consideration of a reduction amount in fastening force of the bolt mentioned above, the fastening torque of the bolt is set higher than the torque required for simple fixation.

However, in the case where the bolt fastening torque is set higher, a longer period of time is required for detaching and attaching the bolt, resulting in a low level of workability in assembly and disassembly of the variable displacement type exhaust turbo supercharger.

Here, in the variable displacement type exhaust turbo supercharger, the turbine housing and the bearing housing are fixed with the nozzle mount sandwiched therebetween. In other words, the turbine housing, the bearing housing, and the bolt serve also as fixing devices for fixing the nozzle mount.

In this construction it is not necessary to separately provide a fixation device for fixing the nozzle mount. As a result, the number of parts is reduced and production cost is reduced.

However, in such a construction where the nozzle mount is clamped and fixed between the turbine housing and the bearing housing, the fastening force of the bolt acts not only as force to fix the turbine housing and the bearing housing but also as force for the turbine housing and the bearing housing to retain the nozzle mount. In other words, in this construction, since the fastening force of the bolt is distributed, more reliable fixation of the turbine housing and the bearing housing the bolt is required.

The present invention takes the above circumstances into consideration, and its object is to provide an exhaust turbo supercharger that is able to effectively prevent exhaust gas that has flowed into between the turbine housing and the bearing housing from leaking to outside of the device, while also providing an excellent level of workability in assembly and disassembly.

In order to solve above problems, the present invention provides the following means.

A first aspect of the present invention provides an exhaust turbo supercharger having: a turbine housing, into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a bolt insert hole is formed in the turbine housing, an internal thread insert made from a heat insulating material is provided in the bolt insert hole, and the turbine housing and the bearing housing are detachably fixed by a bolt that engages with the internal thread insert.

In the exhaust turbo supercharger according to the first aspect of the present invention mentioned above, heat transmission between the turbine housing and the bolt is prevented by the internal thread insert made from a heat insulating material that is provided in the bolt insert hole of the turbine housing.

As a result, even if the temperature of the turbine housing rises while operating the exhaust turbo supercharger, since the temperature rise in the bolt is suppressed, and the thermal expansion amount of the bolt is reduced, a reduction in the fastening force of the bolt is unlikely to occur.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

A second aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a through hole is formed in the turbine housing, the turbine housing and the bearing housing are detachably fixed by a bolt inserted into the through hole, and a nut that engages with the bolt; and an insert made from a heat insulating material, or an air layer, is provided between an inner surface of the through hole and the bolt.

In the exhaust turbo supercharger according to the second aspect of the present invention, between the inner surface of the through hole of the turbine housing and the bolt, there is formed the insert made from a heat insulating material, or the air layer, and this insert or air layer prevents heat transmission between the turbine housing and the bolt.

As a result, even if the temperature of the turbine housing rises while operating the exhaust turbo supercharger, since the temperature rise in the bolt is suppressed, and the thermal expansion amount of the bolt is reduced, a reduction in the fastening force of the bolt is unlikely to occur.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

Moreover, a third aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a screw hole is formed in the turbine housing, heat radiating fins or heat radiating grooves are formed in the vicinity of the screw hole, and the turbine housing and the bearing housing are detachably fixed by a bolt that engages with the screw hole.

In the exhaust turbo supercharger according to the third aspect of the present invention, in the vicinity of the screw hole of the turbine housing, heat radiating fins or heat radiating grooves are provided to increase the area in contact with the outside air.

Therefore, even if the temperature of the turbine housing rises while operating the exhaust turbo supercharger, in the vicinity of the screw hole in the turbine housing, heat is effectively radiated to the surrounding area and the temperature rise is suppressed.

As a result, temperature rise in the bolt that engages with this screw hole is suppressed, and the thermal expansion amount of the bolt is reduced. Therefore, the fastening force of the bolt is unlikely to decrease.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

Moreover, a fourth aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein there is formed a screw hole in the turbine housing; the turbine housing and the bearing housing are detachably fixed by a bolt that engages with the screw hole; and a through hole is provided in the bolt along the axis of the bolt.

In the exhaust turbo supercharger according to the fourth aspect of the present invention, on the bolt for fixing the turbine housing and the bearing housing, a through hole is formed along the axial direction.

As a result, the surface area of the bolt is increased and the amount of heat radiated from the bolt increases, while the bolt is cooled down by outside air that flows into the through hole.

As a result, even if the temperature of the turbine housing rises while operating the exhaust turbo supercharger, since the temperature rise in the bolt is suppressed, and the thermal expansion amount of the bolt is reduced, a reduction in the fastening force of the bolt is unlikely to occur.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

In this exhaust turbo supercharger, the screw hole provided in the turbine housing may be a through hole, or, in the case of a blind screw hole, in the bottom section of this screw hole a through hole in the area that opposes to a through hole in a bolt may be provided. In this case, since outside air can more easily flow through inside the bolt through the hole, a temperature rise in the bolt becomes more unlikely to occur, and a reduction in the contact pressure on the gasket due to thermal expansion of the bolt can be effectively prevented.

Moreover, a fifth aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a screw hole is formed in the turbine housing; the turbine housing and the bearing housing are detachably fixed by a bolt that engages with the screw hole; and on an inner surface of the turbine housing in an area in contact with the exhaust gas, a heat shield layer is formed.

In the exhaust turbo supercharger according to the fifth aspect of the present invention, the heat shield layer provided on the inner surface of the turbine housing prevents heat transmission from the exhaust gas that has been introduced into the turbine housing, to the turbine housing.

As a result, even while operating the exhaust turbo supercharger, temperature rise in the turbine housing is suppressed, and the thermal expansion amounts of the turbine housing and the bolt that engages with the turbine housing are reduced. As a result, the fastening force of the bolt is unlikely to decrease.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

Moreover, in this exhaust turbo supercharger, since the heat shielding capacity of the turbine housing is improved, the efficiency of the turbine can be improved.

Furthermore, in this exhaust gas turbo supercharger, since temperature rise in the turbine housing can be suppressed, the load on the turbine housing due to heat stress can be reduced and the durability of the turbine housing can be improved.

Moreover, a sixth aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a screw hole is formed in the bearing housing, and the turbine housing and the bearing housing are detachably fixed by a bolt that engages with the screw hole.

In the exhaust turbo supercharger according to the sixth aspect of the present invention mentioned above, the screw hole is provided in the bearing housing, where the temperature is unlikely to rise, and the turbine housing and the bearing housing are connected by the bolt that engages with the screw hole.

In other words, in the bolt that connects the turbine housing and the bearing housing, the thread face, which is the largest area that comes in contact with other members, is brought in contact with the bearing housing, in which a temperature rise is unlikely to occur.

Therefore, in this exhaust turbo supercharger, even while operating the exhaust turbo supercharger, the heat of the turbine housing is unlikely to be transmitted to the bolt, and thermal expansion amount of the bolt is reduced. As a result, the fastening force of the bolt is unlikely to decrease.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

Moreover, in this exhaust turbo supercharger, since the head section of the bolt faces the turbine housing side (end section side of the exhaust turbo supercharger), tools (such as a spanner) can easily enter in the vicinity of the head section of the bolt, enabling easy operation of attaching and detaching the bolt.

Moreover, a seventh aspect of the present invention provides an exhaust turbo supercharger having: a turbine housing, into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a screw hole is formed in the turbine housing; the turbine housing and the bearing housing are detachably fixed by a bolt that engages with the screw hole; and between a head section of the bolt and the bearing housing there is provided an elastic member in a state of being compressed in the axial direction of the bolt.

In the exhaust turbo supercharger according to the seventh aspect of the present invention, between the bolt and the bearing housing there is provided the elastic member in a state of being compressed in the axial direction of the bolt.

As a result, when a difference occurs between the thermal expansion amounts of the turbine housing and the bolt and the thermal expansion amount of the bearing housing, the elastic member returns from its compressed state by this difference amount, thereby compensating for the difference between these thermal expansion amounts. Therefore, a decrease in the fastening force of the bolt is unlikely to occur.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

Here, as the elastic member, for example, a spring such as a conical spring washer or a bush made from rubber or resin having elasticity may be used.

Moreover, an eighth aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a screw hole is formed in the turbine housing, the turbine housing and the bearing housing are detachably fixed by a bolt that engages with the screw hole, and in the bearing housing, a bolt support section that receives the bolt is able to elastically deform in the axial direction of the bolt, and the bolt support section receives the bolt in a state of being elastically deformed to the turbine housing side.

In the exhaust turbo supercharger according to the eighth aspect of the present invention, in the bearing housing, the bolt support section that receives the bolt is able to elastically deform in the axial direction of the bolt.

This bolt support section receives the bolt in a state of being elastically deformed toward the turbine housing side.

As a result, when a difference occurs between the thermal expansion amounts of the turbine housing and the bolt, and thermal expansion amount of the bearing housing, the bolt support section returns by this amount in the direction that reduces its elastic deformation, thereby compensating for the difference between these thermal expansion amounts. Therefore, a decrease in the fastening force of the bolt is unlikely to occur.

In this exhaust turbo supercharger, since a reduction in the fastening force of the bolt is unlikely to occur as described above, thereby ensuring the contact pressure of the gasket, the sealing capacity of the gasket can be ensured without setting the fastening force of the bolt high.

Moreover, a ninth aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a screw hole is formed in the turbine housing, in the turbine housing a cylindrical male engaging section that surrounds the turbine shaft is provided, in the bearing housing there is provided a female engaging section into which the male engaging section is inserted, an inner surface of which is fitted together with the male engaging section, and the turbine housing and the bearing housing are detachably fixed by a bolt that engages with the screw hole, in a state where the male engaging section and the female engaging section are fitted together.

Here, as mentioned above, even while operating the exhaust turbo supercharger, the temperature of the bearing housing is unlikely to rise compared to the turbine housing, and the thermal expansion amount of the bearing housing is smaller than that of the turbine housing.

In the exhaust turbo supercharger according to the ninth aspect of the present invention, the male engaging section is provided in the turbine housing, and in the bearing housing there is provided the female engaging section that is fitted together with the male engaging section (so called spigot coupling).

Accordingly, when operating this exhaust turbo supercharger, the temperature of the turbine housing rises, and the male engaging section provided in the turbine housing also thermal-expands toward the radial direction outside.

On the other hand, the thermal expansion amount of the female engaging section provided in the bearing housing is smaller than that of the male engaging section. As a result, when the temperature of the turbine housing rises, the outer circumference surface of the male engaging section comes in tight contact with the inner circumference surface of the female engaging section, sealing between the turbine housing and the bearing housing. Adhesion between the male engaging section and the female engaging section becomes stronger as the difference between the thermal expansion amounts of the male engaging section and the female engaging section (in other words, the difference between the thermal expansion amounts of the turbine housing and the bearing housing) increases, and the sealing property between the turbine housing and the bearing housing becomes more reliable.

As a result, even if a difference occurs between the thermal expansion amounts of the turbine housing and the bolt, and the bearing housing, so that the fastening force of the bolt decreases, leakage of exhaust gas from between the turbine housing and the bearing housing is prevented.

Therefore, in this exhaust turbo supercharger, sealing capacity of the gasket can be ensured without setting the fastening force of the bolt high.

Moreover, a tenth aspect of the present invention provides an exhaust turbo supercharger having: a turbine housing into which exhaust gas from an internal combustion engine is introduced; a turbine wheel which is provided within the turbine housing and which is rotation-driven by the exhaust gas; a turbine shaft, one end of which is inserted into the turbine housing, and to which the turbine wheel is attached; a bearing which supports the turbine shaft; a bearing housing which is connected to the turbine housing and inside of which the bearing is housed; and a gasket which seals, in an area outside in the radial direction of the turbine shaft, between the turbine housing and the bearing housing; wherein a screw hole is formed in the turbine housing, and between the turbine housing and the bearing housing, there are provided in the following order toward the radial direction outside of the turbine shaft: a narrow section in which a distance between the turbine housing and the bearing housing is short; and an expanded section in which a distance between the turbine housing and the bearing housing is greater than that in the narrow section; and the turbine housing and the bearing housing are detachably fixed by a bolt that engages with the screw hole.

In the exhaust turbo supercharger according to the tenth aspect of the present invention mentioned above, between the turbine housing and the bearing housing there are provided the narrow section and the expanded section, in that order toward the gasket.

The narrow section serves as an aperture that reduces the pressure of exhaust gas flowed in from an insertion passage section of the turbine shaft of the turbine housing to between the turbine housing and the bearing housing.

The exhaust gas that has passed through the narrow section expands when flowing into the expanded section, reducing the pressure thereof.

As described, in this exhaust turbo supercharger, the pressure applied by exhaust gas on the gasket can be low. Therefore, even if a difference in the thermal expansion amounts between the turbine housing and the bolt, and the bearing housing occurs, and the fastening force of the bolt decreases, leakage of exhaust gas from between the turbine housing and the bearing housing is prevented.

In particular, in the case where the pressure variation of the exhaust gas is significant, leakage of exhaust gas from between the turbine housing and the bearing housing can be effectively prevented.

Specifically, as the exhaust gas that has entered between the turbine housing and the bearing housing passes through the narrow section, a time difference occurs in the pressure variance with the exhaust gas within the turbine housing.

As a result, in the expanded section, the pressure of exhaust gas is averaged and the inner pressure of the expanded section becomes lower than the peak pressure of the exhaust gas.

Therefore, in this exhaust turbo supercharger, sealing capacity of the gasket can be ensured without setting the fastening force of the bolt high.

Here, in the exhaust turbo supercharger according to the tenth aspect mentioned above, in the turbine housing, there may be provided a bypass flow passage that continues from the expanded section to the vicinity of an exit of the exhaust gas.

Since almost all the energy of the exhaust gas that has been introduced into the turbine housing is consumed in rotation driving the turbine wheel, the pressure of the exhaust gas at the exhaust gas exit of the turbine housing is approximately equal to atmospheric pressure.

Accordingly, in the case where the pressure of the exhaust gas within the expanded section is greater than the pressure of the exhaust gas in the vicinity of the exhaust gas exit of the turbine housing, the exhaust gas within the expanded section travels through the bypass passage and flows into the vicinity of the exhaust gas exit of the turbine housing, reducing the inner pressure of the expanded section.

Therefore, the pressure applied by the exhaust gas to the gasket is further reduced, and sealing capacity of the gasket can be ensured.

According to the present invention, an exhaust turbo supercharger that is able to effectively prevent exhaust gas that has flowed into between the turbine housing and the bearing housing from leaking to outside of the device, while allowing an excellent level of workability in assembly and disassembly, can be provided.

DETAILED DESCRIPTION OF THE INVENTION

Hereunder, embodiments of the present invention are described, with reference to the drawings.

First Embodiment

Figure 1:
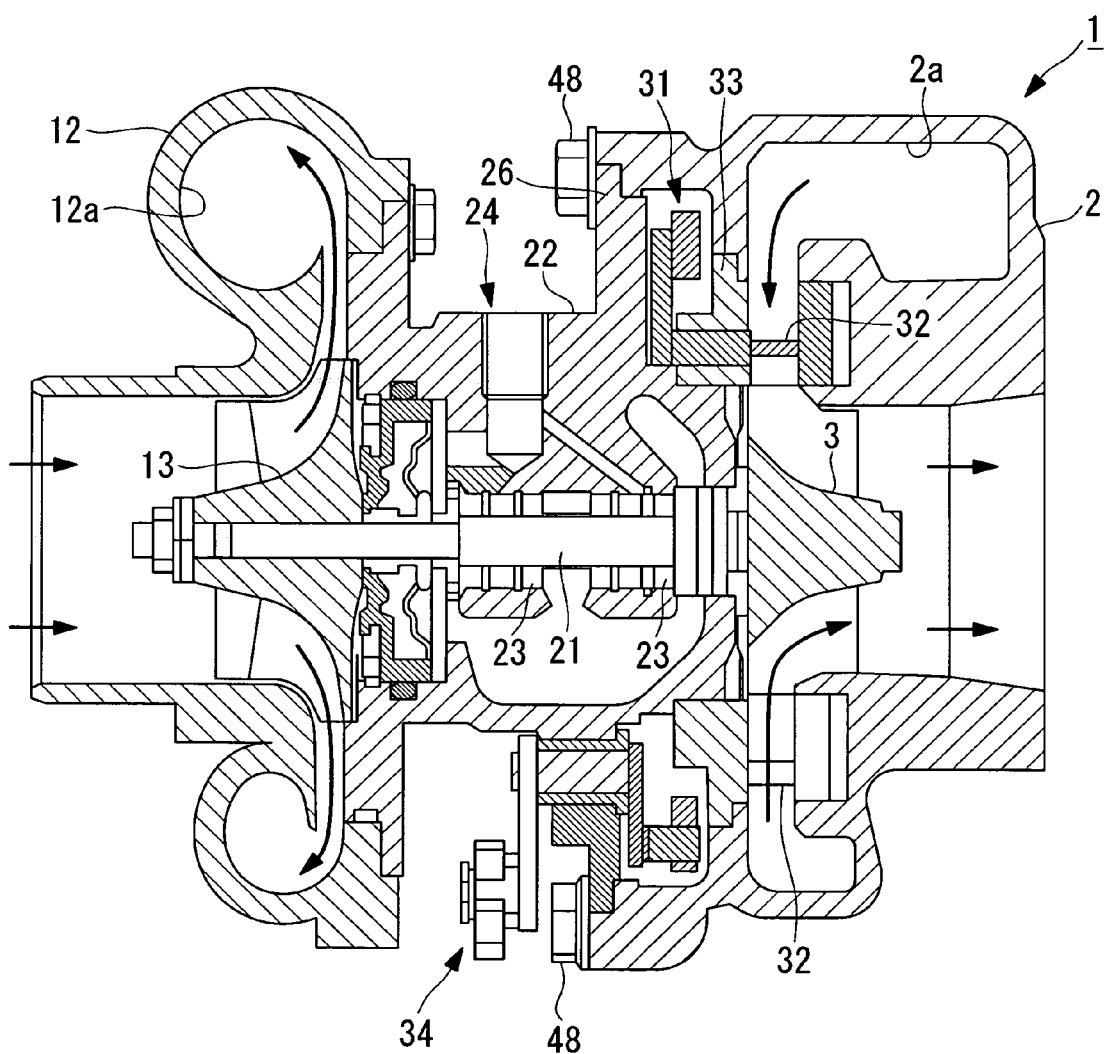
FIG. 1 is a vertical sectional view showing the construction of an exhaust turbo supercharger according to a first embodiment of the present invention.
Figure 2:
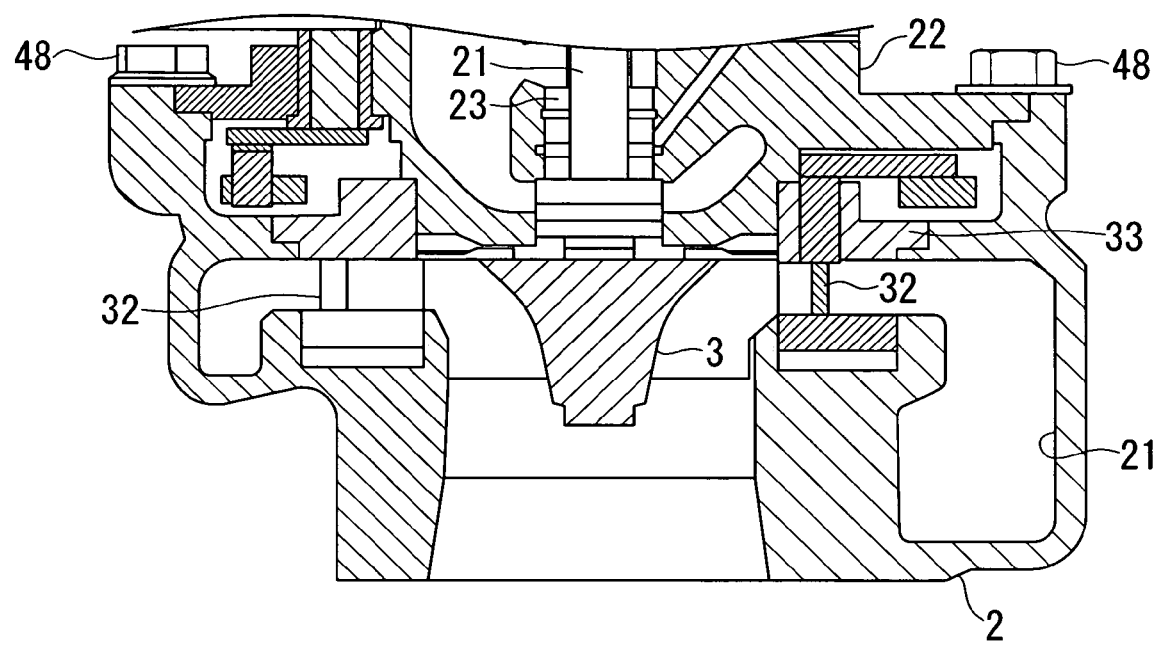
FIG. 2 is a partial enlargement of FIG. 1.

Hereunder, a first embodiment of the present invention is described, with reference to FIG. 1 and FIG. 2. In the present embodiment, an example in which the present invention is applied to a VG exhaust turbo supercharger is described. The present invention is not limited to this example and may be applied to a generic exhaust turbo supercharger.

As shown in the vertical sectional view of FIG. 1, an exhaust turbo supercharger 1 according to the present embodiment has a turbine housing 2 inside of which there is formed a spiral flow passage 2a, and a turbine wheel 3, which is provided in a substantially radial direction center section of this turbine housing 2. Into the spiral flow passage 2a of the turbine housing 2, exhaust gas from an internal combustion engine (not shown in the drawing) is supplied. The turbine wheel 3 is rotation driven by exhaust gas supplied into this spiral flow passage 2a. Here, material of the turbine wheel is generic heat resistant alloy.

Moreover, this exhaust turbo supercharger 1 has a compressor housing 12, inside of which there is formed a spiral flow passage 12a, and a compressor wheel 13 which is provided in a substantially radial direction center of the compressor housing 12. The compressor wheel 13 is rotation driven to take outside air into the compressor housing 12 and delivers the outside air that has been taken in, into the spiral flow passage 12a in the compressor housing 12. The spiral flow passage 12a of the compressor housing 12 is connected to an air intake system of the internal combustion engine. Accordingly, the outside air that has been delivered into this spiral flow passage 12a by the compressor wheel 13, is forcefully delivered to the air intake system of the internal combustion engine.

The turbine wheel 3 and the compressor wheel 13 are linked by a turbine shaft 21. A bearing housing 22 is provided between the turbine housing 2 and the compressor housing 12. In the bearing housing 22, there is provided a bearing 23 that supports the turbine shaft 21, allowing it to rotate about the axis. Moreover, in the bearing housing 22 there is provided a lubrication mechanism 24 that supplies lubricating oil to the bearing 23 to lubricate and cool the bearing 23. The bearing housing 22 is cooled by the lubricating oil supplied by this lubrication mechanism 24. Here, the material of the bearing housing 22 is generally cast iron.

In this exhaust turbo supercharger 1, exhaust gas introduced from an exhaust system of the internal combustion engine into the spiral flow passage 2a in the turbine housing 2, rotation-drives the turbine wheel 3.

As the turbine wheel 3 is rotation driven in this manner, this driving force is transmitted to the compressor wheel 13 via the turbine shaft 21, and the compressor wheel 13 is thereby rotation-driven.

Thus, the compressor wheel takes outside air into the compressor housing 12 and delivers the outside air that has been taken in, into the spiral flow passage 12a in the compressor housing 12. As a result, the outside air that has been taken into the compressor housing 12 is forcefully supplied into a combustion chamber of the internal combustion engine.

Furthermore, in this exhaust turbo supercharger 1, as shown in FIG. 2, in the turbine housing 2 there is provided a variable nozzle mechanism 31 that adjusts the capacity of the turbine.

The variable nozzle mechanism 31 has nozzle vanes 32 arranged on the inner circumference side of the spiral flow passage 2a in the turbine housing 2, in a plurality of positions at equal intervals in the circumferential direction of the turbine wheel 3. Each of the nozzle vanes 32 is provided on a ring shaped nozzle mount 33 attached to the turbine housing 2, and blade angles thereof (angle with respect to the radius line of the spiral flow passage 2a) can be respectively adjusted by an actuator 34.

By adjusting the blade angle of each of the nozzle vanes 32 with the actuator 33, the variable nozzle mechanism 31 adjusts the sectional area of the flow passage from the spiral flow passage to the turbine wheel 3 to adjust the flow speed of exhaust gas delivered to the turbine wheel 3. By adjusting the flow speed of exhaust gas delivered to the turbine wheel 3 in this manner, the rotation speed of the turbine wheel 3 is adjusted, and the volume of air delivered to the air intake system by the compressor wheel 13 can be adjusted.

Here, the turbine housing 2 and the bearing housing 22 are fixed, with the nozzle mount 33 sandwiched therebetween. That is to say, the turbine housing 2, the bearing housing 22, and a bolt 48, described later, serve also as fixing devices for fixing the nozzle mount 33.

In this exhaust turbo supercharger 1, because such a structure for fixing the nozzle mount 33 described above is employed, separate fixing devices for fixing the nozzle mount 33 need not be provided, and the number of parts can be reduced, lowering the production cost.

Figure 3:
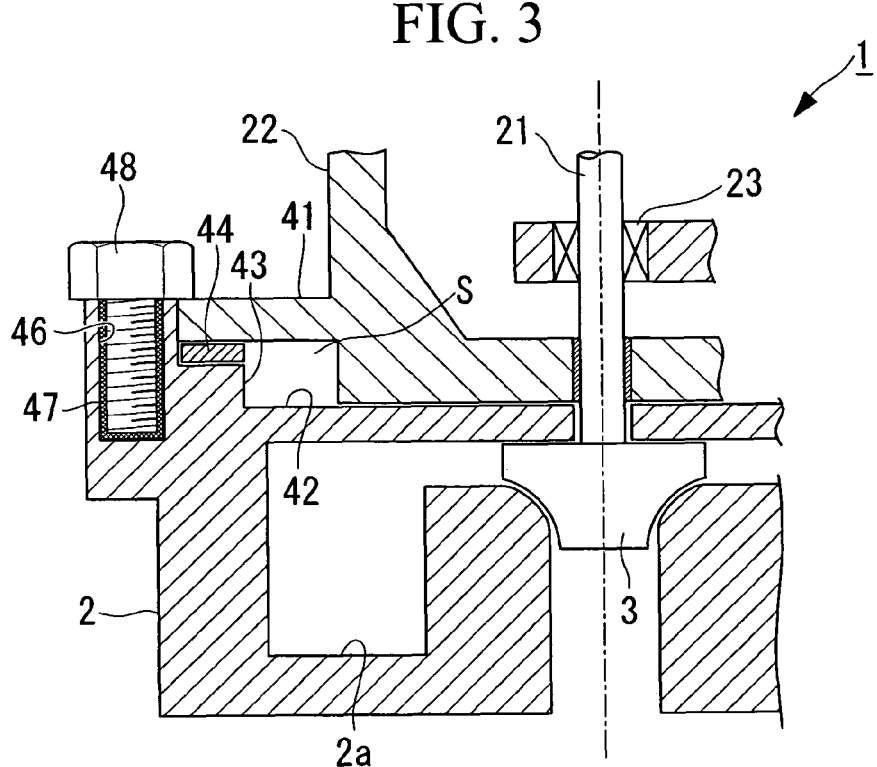
FIG. 3 is a schematic drawing of FIG. 2.

Hereunder, a structure for connecting the turbine housing 2 and the bearing housing 22 is specifically described, with reference to FIG. 3. In FIG. 3, in order to facilitate understanding of the connection structure of the turbine housing 2 and the bearing housing 22, the shapes of the turbine housing 2 and the bearing housing 22 are drawn in simplified forms. Moreover, for the same reason, a supporting structure for the nozzle mount 33 is omitted from the drawing in FIG. 3.

In the bearing housing 22, on the end to be connected with the turbine housing 2, there is provided a flange section 41 on the outer circumference of the bearing housing 22.

Moreover, in the turbine housing 2, on the end that connects to the bearing housing 22, there is provided a concave section 42 that houses the end to be connected with the turbine housing 2 of the bearing housing 22 along with the flange section 41.

The internal diameter of the concave section 42 is substantially equal to the outer diameter of the flange section 41. Furthermore, around the entire circumference of the bottom section outer periphery of the concave section 42, there is provided a step section 43 that projects in the opening direction (bearing housing 22 side) of the concave section 42. On this step section 43, there is provided a gasket 44 that receives the flange section 41 of the bearing housing 22, to seal between the step section 43 and the bearing housing 22.

Here, the radial direction widths of the step section 43 and the gasket 44 are narrower than that of the flange section 41. As a result, on the radial direction inside of the step section 43 and the gasket 44, a space S is formed around the entire circumference, between the flange section 41, the turbine housing 2 and the bearing housing 22.

In the turbine housing 2, there is provided a plurality of bolt insert holes 46 along the periphery of the concave section 42. In the present embodiment, the bolt insert hole 46 is a blind hole.

Inside this bolt insert hole 46 there is provided an internally threaded insert 47 made of heat insulating material. The material of the internally threaded insert 47 may be ceramic having a low level of thermal conductivity for example.

The turbine housing 2 and the bearing housing 22 are detachably fixed by the internally threaded insert 47 that engages with the bolt 48.

Specifically, the bearing housing 22 is fixed on the turbine housing 2 by the flange section 41 being clamped between the head section of the bolt 48 and the step section 43 of the turbine housing 2. A washer may be attached to the head section of the bolt 48 so that the flange section 41 is clamped between this washer and the step section 43 of the turbine housing 2.

In the exhaust turbo supercharger 1 constructed in this way, heat transmission between the turbine housing 2 and the bolt 48 is prevented by the internally threaded insert 47 made from a heat insulating material provided within the bolt insert hole 46 of the turbine housing 2.

As a result, even if the temperature of the turbine housing 2 rises due to receiving heat of exhaust gas of the internal combustion engine, since the temperature rise of the bolt 48 is suppressed, and the thermal expansion amount of the bolt 48 is reduced, a reduction in the fastening force of the bolt 48 is unlikely to occur.

In this exhaust turbo supercharger 1, since a reduction in the fastening force of the bolt 48 is unlikely to occur as described above, thereby ensuring the contact pressure of the gasket 44, the sealing capacity of the gasket 44 can be ensured without setting the fastening force of the bolt 48 high.

As a result, this exhaust turbo supercharger 1 provides excellent workability in assembly and disassembly while effectively preventing exhaust gas that has flowed into between the turbine housing 2 and the bearing housing 22 from leaking to outside of the device.

Second Embodiment

Figure 4:
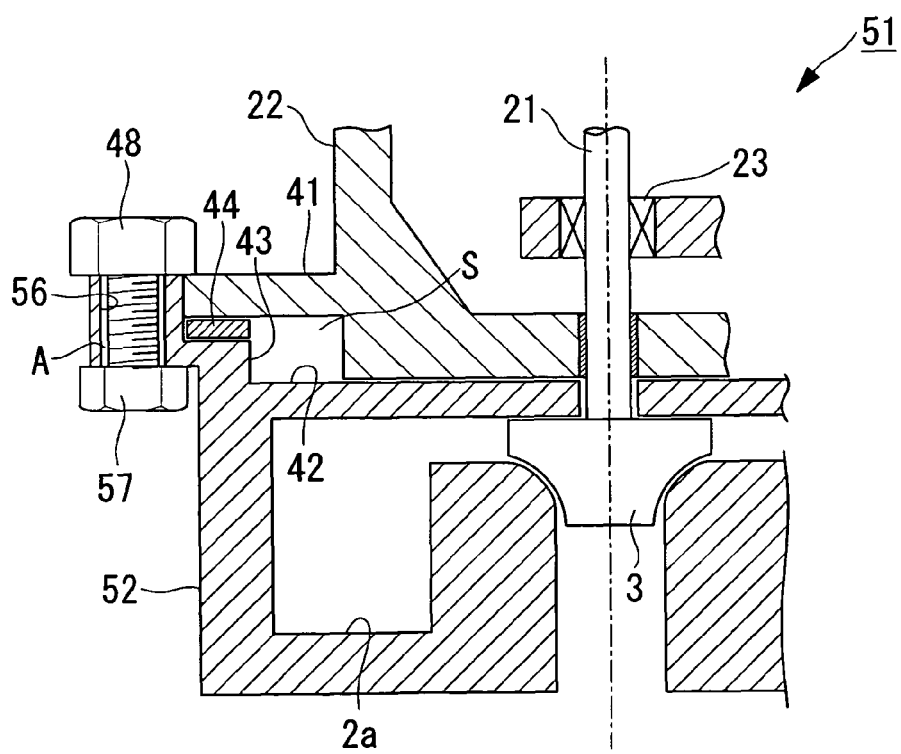
FIG. 4 is a vertical sectional view showing the construction of an exhaust turbo supercharger according to a second embodiment of the present invention.

Next, a second embodiment of the present invention is described, with reference to FIG. 4.

An exhaust turbo supercharger 51 according to the present embodiment is an exhaust turbo supercharger shown in the first embodiment, in which the structure for connecting the turbine housing 2 and the bearing housing 22 has been modified. Hereunder, the same reference symbols are assigned to constructions similar to, or the same as, those in the first embodiment, and detailed descriptions thereof are omitted.

In this exhaust turbo supercharger 51, a turbine housing 52 is used instead of the turbo housing 2. The turbine housing 52 is a turbine housing 2 as shown in the first embodiment, in which, instead of the blind bolt insert hole 46, there is provided a through hole 56 through which the bolt 48 is inserted.

In this exhaust turbo supercharger 51, by inserting the bolt 48 through the through hole 56 of the turbine housing 52 and engaging the nut 57 with the tip end of the bolt 48 that projects from the through hole 56 to clamp the turbine housing and the flange section 41 of the bearing housing 22 between the head section of the bolt 48 and the nut 57, the turbine housing 52 and the bearing housing 22 are fixed.

In the present embodiment, between the through hole 56 and the bolt 48, a gap is formed. In other words, between the inner surface of the through hole 56 and the bolt 48, there is formed an air layer A to minimize the contact area between the bolt 48 and the turbine housing 2.

In the exhaust turbo supercharger 51 constructed in this way, between the inner surface of the through hole 56 of the turbine housing 2 and the bolt 48, there is formed the air layer A, and this air layer A prevents heat transmission between the turbine housing 2 and the bolt 48.

As a result, even if the temperature of the turbine housing 2 rises, the temperature rise of the bolt 48 is suppressed, and the heat expansion amount of the bolt 48 is reduced.

Accordingly, in the exhaust turbo supercharger 51 according to the present embodiment, since a reduction in the fastening force of the bolt 48 is unlikely to occur so that the contact pressure of the gasket 44 is ensured, the sealing capacity of the gasket 44 can be ensured without setting the fastening force of the bolt 48 high.

Here, between the inner surface of the through hole 56 and the bolt 48, there may provided an insert made from a heat insulating material, instead of the air layer A. Also in this case, since the insert prevents heat transmission between the turbine housing 2 and the bolt 48, a reduction in the fastening force of the bolt 48 is unlikely to occur so that the contact pressure of the gasket 44 is ensured, and therefore the sealing capacity of the gasket 44 can be ensured without setting the fastening force of the bolt 48 high.

Third Embodiment

Figure 5:
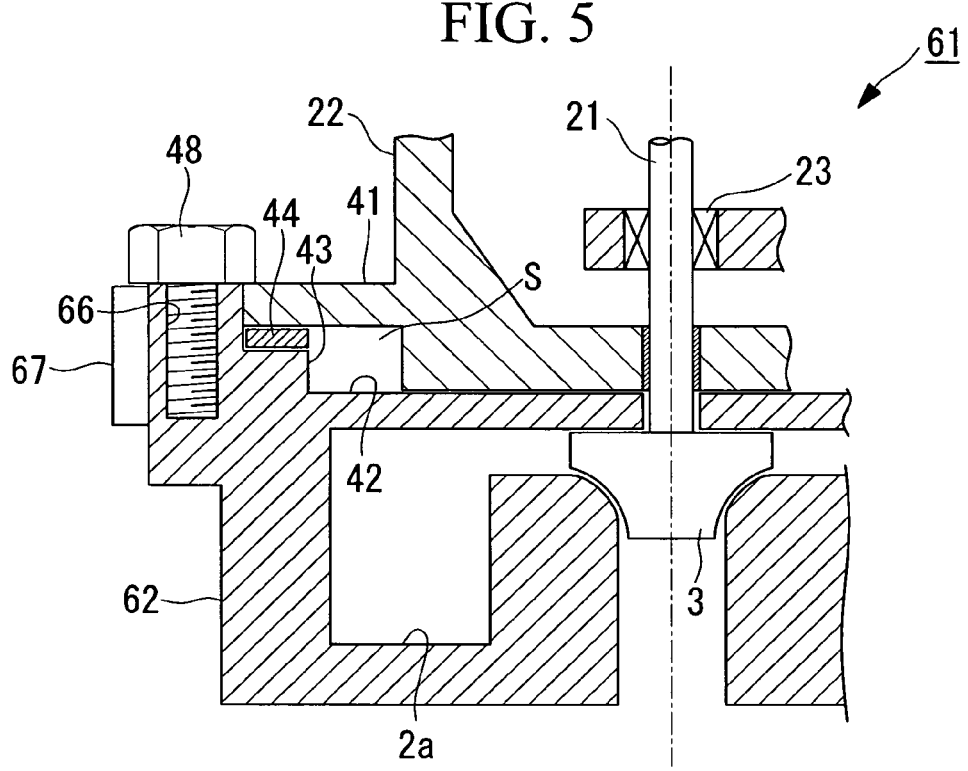
FIG. 5 is a vertical sectional view showing the construction of an exhaust turbo supercharger according to a third embodiment of the present invention.
Figure 6:
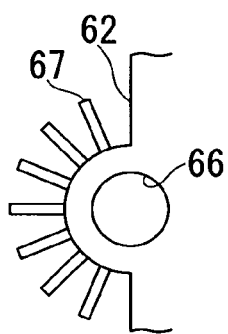
FIG. 6 is a plan view showing the construction of the exhaust turbo supercharger according to the third embodiment of the present invention.

Next, a third embodiment of the present invention is described, with reference to FIG. 5 and FIG. 6.

An exhaust turbo supercharger 61 according to the present embodiment is characterized mainly in that a turbine housing 62 is used instead of the turbine housing 2 in the exhaust turbo supercharger 1 as shown in the first embodiment. Hereunder, the same reference symbols are assigned to constructions similar to, or the same as, those in the first embodiment, and detailed descriptions thereof are omitted.

The turbine housing 62 is a turbine housing 2 as shown in the first embodiment in which, instead of the bolt insert hole 46, there is provided a screw hole 66 with which the bolt 48 is engaged. Moreover, in the turbine housing 62, heat radiating fins 67 are provided in the vicinity of the screw hole 66. In the present embodiment, as shown in FIG. 6, in the turbine housing 62, an area in which the screw hole 66 is formed has a shape that projects toward the outer periphery, and in this area, a plurality of heat radiating fins 67 are arranged, extending in the axial direction of the screw hole 66, along the circumferential direction of the screw hole 66 at intervals.

In the exhaust turbo supercharger 61 constructed in this way, in the vicinity of the screw hole 66 of the turbine housing 62, the heat radiating fins 67 are provided to increase the area of contact with the outside air.

As a result, even if the temperature of the turbine housing 62 rises, in the vicinity of the screw hole 66 in the turbine housing 62, heat is effectively radiated to the surrounding area and the temperature rise is suppressed.

As a result, a rise in temperature of the bolt 48 that engages with this screw hole 66 is suppressed, and a thermal expansion amount of the bolt 48 is reduced.

Accordingly, in this exhaust turbo supercharger 61, since a reduction in the fastening force of the bolt 48 is unlikely to occur, so that the contact pressure of the gasket 44 is ensured, the sealing capacity of the gasket 44 can be ensured without setting the fastening force of the bolt 48 high.

Figure 7:
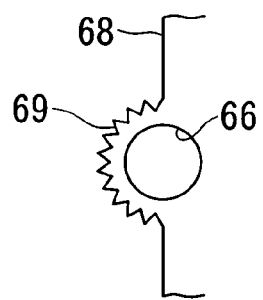
FIG. 7 is a plan view showing another construction example of an exhaust turbo supercharger according to the third embodiment of the present invention.

Here, in this exhaust turbo supercharger 61, a turbine housing 68 shown in FIG. 7 may be used instead of the turbine housing 66. The turbine housing 68 is a turbine housing 62 in which, instead of the heat radiating fins 67, there is provided a plurality of heat radiating grooves 69 that extend along the axial direction of the screw hole 66. FIG. 7 shows an example of providing V grooves as the heat radiating grooves 69. However, the shape of the heat radiating groove 69 is arbitrary.

Also in this case, in the vicinity of the screw hole 66 in the turbine housing 68, heat is effectively radiated to the surrounding area and a rise in temperature can be suppressed.

As a result, a rise in temperature of the bolt 48 that engages with this screw hole 66 is suppressed, and a thermal expansion amount of the bolt 48 is reduced. Accordingly, since a reduction in the fastening force of the bolt 48 is unlikely to occur, so that the contact pressure of the gasket 44 is ensured, the sealing capacity of the gasket 44 can be ensured without setting the fastening force of the bolt 48 high.

Fourth Embodiment

Figure 8:
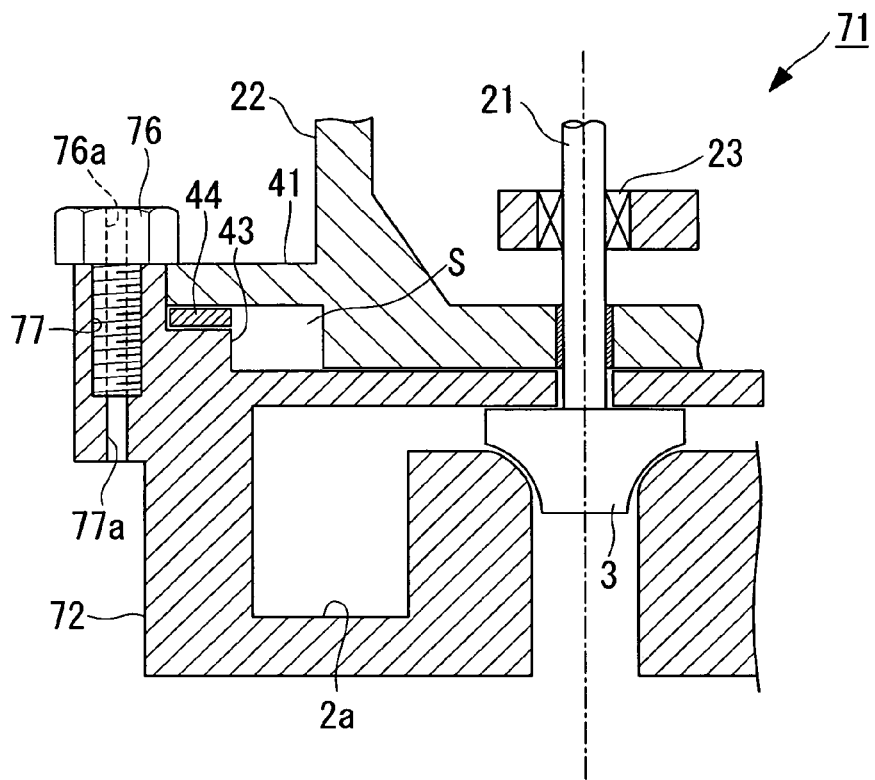
FIG. 8 is a vertical sectional view showing the construction of an exhaust turbo supercharger according to a fourth embodiment of the present invention.

Next, a fourth embodiment of the present invention is described, with reference to FIG. 8.

An exhaust turbo supercharger 71 according to the present embodiment is characterized mainly in that in the exhaust turbo supercharger 1 shown in the first embodiment, a turbine housing 72 is used instead of the turbine housing 2, and a bolt 76 is used instead of the bolt 48. Hereunder, the same reference symbols are assigned to constructions similar to, or the same as, those in the first embodiment, and detailed descriptions thereof are omitted.

The turbine housing 72 is a turbine housing 2 as shown in the first embodiment, in which there is provided a screw hole 77, instead of the bolt insert hole 46. In the present embodiment, on the bottom section of the screw hole 77, there is provided a through hole 77a that is concentric with the screw hole 77 and has a diameter smaller than that of the screw hole 77.

The bolt 76 is a bolt 48 as shown in the first embodiment, in which there is formed a through hole 76a along the axis of the bolt 76.

In the exhaust turbo supercharger 71 constructed in this way, in the bolt 76 that fixes the turbine housing 72 and the bearing housing 22, the through hole 76a is formed along the axial direction.

Accordingly, the surface area of the bolt 76 is increased and the amount of heat radiated from the bolt 76 increases, while the bolt 76 is cooled down by outside air that flows into the through hole 76a.

In the present embodiment, in the area on the bottom section of the screw hole 77 which opposes to the through hole 76a of the bolt 76, the through hole 77a is provided. Accordingly, since outside air travels through the through hole 76a of the bolt 76 more easily, the temperature rise in the bolt 76 becomes further unlikely to occur.

As described above, in this exhaust turbo supercharger 71, even if the temperature of the turbine housing 72 rises, since the temperature rise in the bolt 76 can be suppressed, and the thermal expansion amount of the bolt 76 is reduced, a decrease in the fastening force of the bolt 76 is unlikely to occur, so that contact pressure of the gasket 44 can be ensured.

In this exhaust turbo supercharger 71, since a reduction in the fastening force of the bolt 76 is unlikely to occur as described above, thereby ensuring the contact pressure of the gasket 44, the sealing capacity of the gasket 44 can be ensured without setting the fastening force of the bolt 76 high.

In this exhaust turbo supercharger, the screw hole provided in the turbine housing may be a through hole. In this case too, since outside air travels through the through hole 76a of the bolt 76 more easily, the temperature rise in the bolt 76 becomes further unlikely to occur.

Fifth Embodiment

Figure 9:
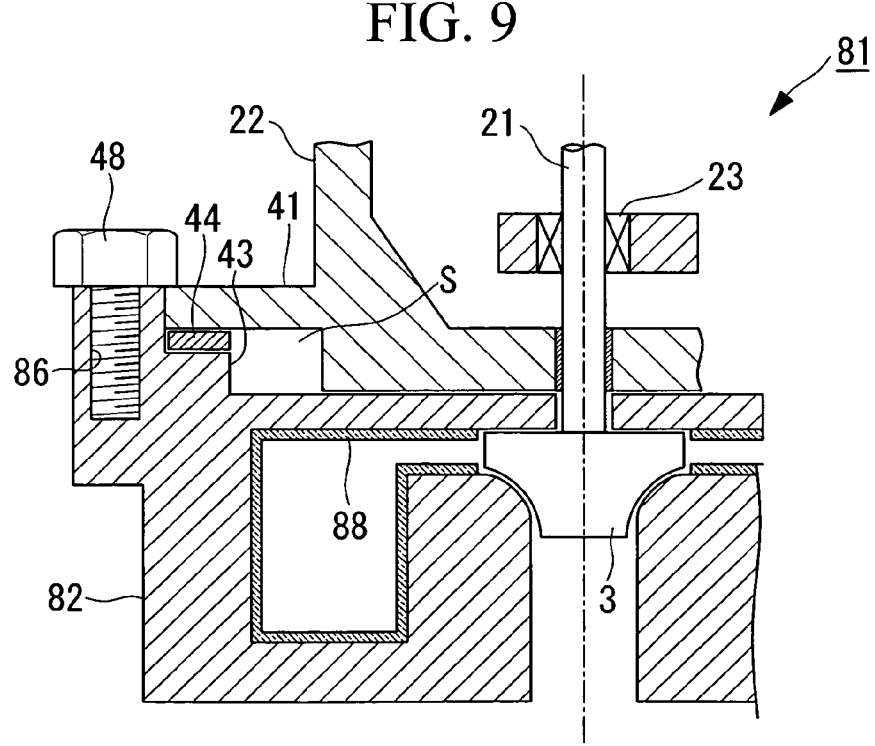
FIG. 9 is a vertical sectional view showing the construction of an exhaust turbo supercharger according to a fifth embodiment of the present invention.

Next, a fifth embodiment of the present invention is described, with reference to FIG. 9.

An exhaust turbo supercharger 81 according to the present embodiment is characterized mainly in that in the exhaust turbo supercharger 1 as shown in the first embodiment, a turbine housing 82 is used instead of the turbine housing 2. Hereunder, the same reference symbols are assigned to constructions similar to, or the same as, those in the first embodiment, and detailed descriptions thereof are omitted.

The turbine housing 82 is a turbine housing 2 as shown in the first embodiment, in which there is provided a screw hole 86, instead of the bolt insert hole 46. In the present embodiment, the screw hole 86 is a blind hole.

Moreover, on the inner surface of the turbine housing 82, in the area that comes in contact with exhaust gas, a heat shield layer 88 made from a heat insulating material is formed.

In the present embodiment, in the turbine housing 82, in the area of the inner surface of the spiral flow passage 2a and from the spiral flow passage 2a to the vicinity of the outer periphery of the turbine wheel, the heat shield layer 88 is formed.

As the heat shield layer 88, for example, a heat shield coating film made from a sprayed film of Co—Ni—Cr—Al—Y alloy or the like may be used.

Furthermore, as the heat shield layer 88, a thin-walled heat shield tube, the outer shape of which substantially corresponds to the inner surface shape of the spiral flow passage 2a may be provided. As this heat shield tube, for example, a stainless steel tube or ceramic tube having a low level of thermal conductivity, may be used.

In the exhaust turbo supercharger 81 constructed in this way, the heat shield layer 88 provided on the inner surface of the turbine housing 82 prevents heat transmission from the exhaust gas introduced into the turbine housing 82 to the turbine housing 82.

As a result, even when operating the exhaust turbo supercharger 81, a temperature increase of the turbine housing 82 can be suppressed, and the thermal expansion amount of the turbine housing 82 and the bolt 48 that engages with the turbine housing 82 is reduced. Therefore, a decrease in the fastening force of the bolt 48 is unlikely to occur, so that the contact pressure of the gasket 44 can be ensured.

In this exhaust turbo supercharger 81, since a reduction in the fastening force of the bolt 48 is unlikely to occur as described above, thereby ensuring the contact pressure of the gasket 44, the sealing capacity of the gasket 44 can be ensured without setting the fastening force of the bolt 48 high.

Moreover, in this exhaust turbo supercharger 81, since the heat shielding capacity of the turbine housing 82 is improved, the efficiency of the turbine can be improved.

Furthermore, in this exhaust gas turbo supercharger 81, since a temperature increase in the turbine housing 82 can be suppressed, the load on the turbine housing 82 due to heat stress can be reduced, and the durability of the turbine housing 82 can be improved.

Sixth Embodiment

Figure 10:
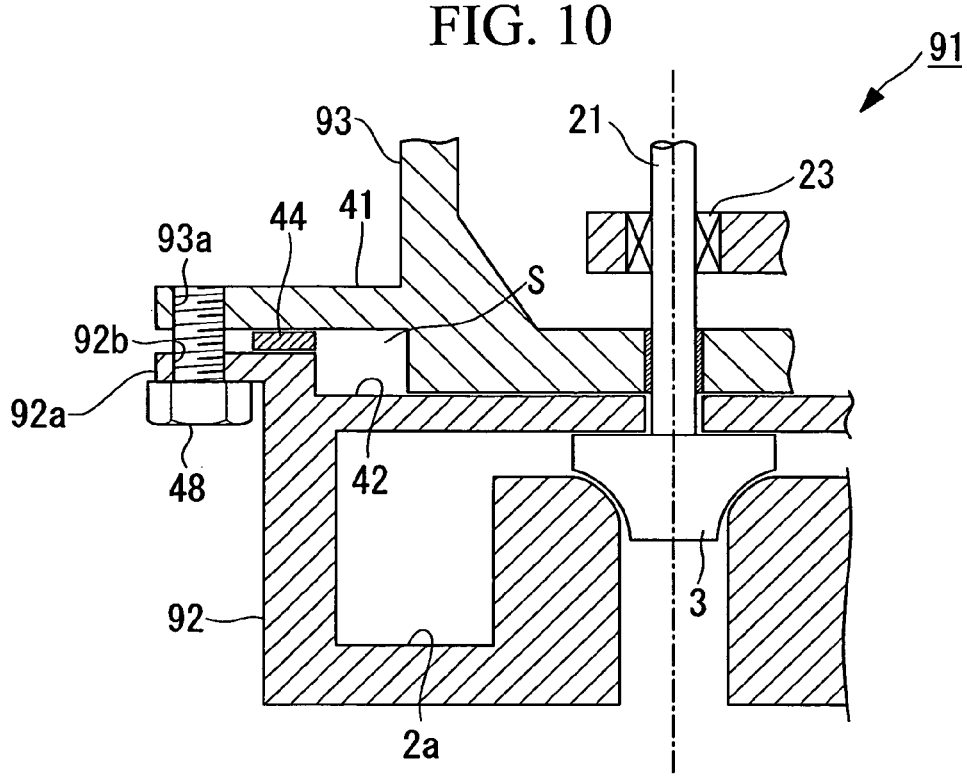
FIG. 10 is a vertical sectional view showing the construction of an exhaust turbo supercharger according to a sixth embodiment of the present invention.

Next, a sixth embodiment of the present invention is described, with reference to FIG. 10.

An exhaust turbo supercharger 91 according to the present embodiment is characterized mainly in that in the exhaust turbo supercharger 1 as shown in the first embodiment, a turbine housing 92 is used instead of the turbine housing 2, and a bearing housing 93 is used instead of the bearing housing 22. Hereunder, the same reference symbols are assigned to constructions similar to, or the same as, those in the first embodiment, and detailed descriptions thereof are omitted.

The turbine housing 92 is a turbine housing 2 as shown in the first embodiment, in which the concave section 42 is formed to have diameter smaller than the flange section 41 of the bearing housing 93, a flange section 92a is provided on an end that connects to the bearing housing 93, and instead of the bolt insert hole 46, a through hole 92b that passes through the flange section 92a in the thickness direction, is provided in the flange section 92a.

In this exhaust turbo supercharger 91, in the turbine housing 92, the gasket 44 is interposed between: the area between the area in which the through hole 92b is formed and the concave section 42, and the flange section 41 of the bearing housing 93.

The bearing housing 93 is one where, in the bearing housing 22, a screw hole 93a is provided in the flange section 41.

In the exhaust turbo supercharger 91 constructed in this way, the screw hole 93a is provided in the bearing housing 93, in which a temperature rise is less likely to occur compared to the turbine housing 92 that comes in contact with exhaust gas, and the turbine housing 92 and the bearing housing 93 are connected by the bolt 48 that engages with this screw hole 93a.

In other words, in the bolt 48 that connects the turbine housing 92 and the bearing housing 93, the thread face, which is the largest area that comes in contact with other members, is brought in contact with the bearing housing 93, in which a temperature rise is unlikely to occur.

Therefore, in this exhaust turbo supercharger 91, since the temperature of the turbine housing 93 is unlikely to be transmitted to the bolt 48 so that the thermal expansion amount of the bolt 48 is reduced, a decrease in the fastening force of the bolt 48 is unlikely to occur, so that the contact pressure of the gasket 44 can be ensured.

In this exhaust turbo supercharger 91, since a reduction in the fastening force of the bolt 48 is unlikely to occur as described above, thereby ensuring the contact pressure of the gasket 44, the sealing capacity of the gasket 44 can be ensured without setting the fastening force of the bolt 48 high.

Moreover, in this exhaust turbo supercharger 91, since the head section of the bolt 48 faces the turbine housing 92 side (end section side of the exhaust turbo supercharger 91), tools (such as a spanner) can easily enter in the vicinity of the head section of the bolt 48, enabling easy operation of attaching and detaching the bolt 48.

Seventh Embodiment

Figure 11:
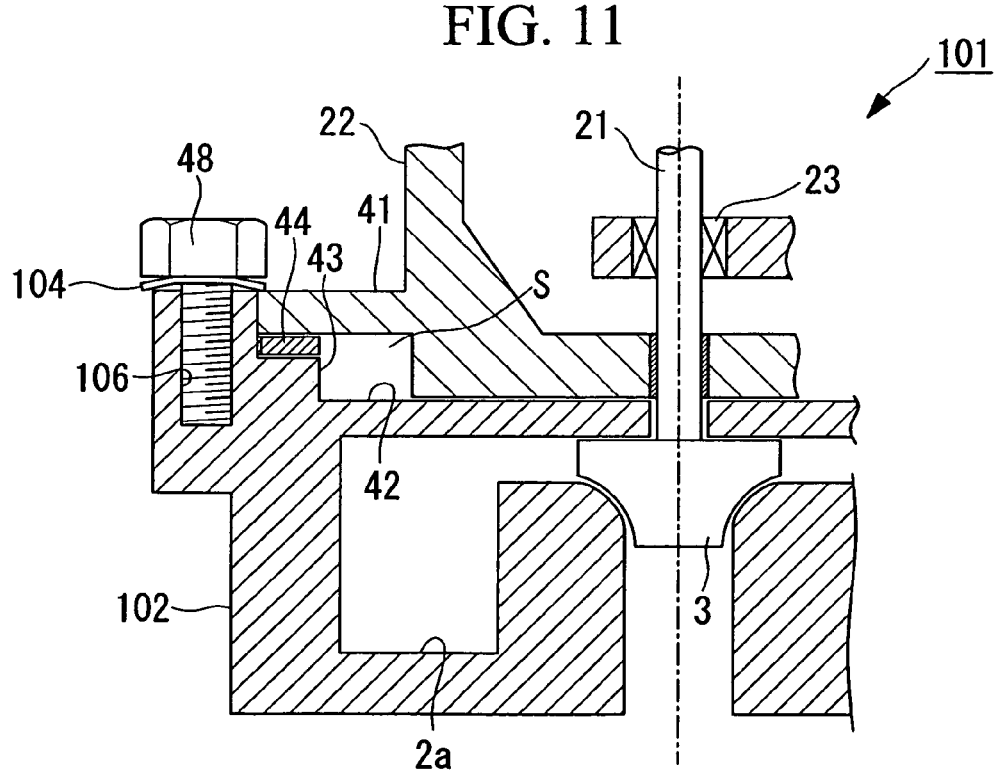
FIG. 11 is a vertical sectional view showing the construction of an exhaust turbo supercharger according to a seventh embodiment of the present invention.

Next, a seventh embodiment of the present invention is described, with reference to FIG. 11.

The exhaust turbo supercharger 101 according to the present embodiment is characterized mainly in that in the exhaust turbo supercharger 1 as shown in the first embodiment, a turbine housing 102 is used instead of the turbine housing 2, and between the head section of the bolt 48 and the flange section 41 of the bearing housing 22, there is provided an elastic member 104 in a state of being compressed in the axial direction of the bolt 48. Hereunder, the same reference symbols are assigned to constructions similar to, or the same as, those in the first embodiment, and detailed descriptions thereof are omitted.

The turbine housing 102 is a turbine housing 2 as shown in the first embodiment, in which there is provided a screw hole 106, instead of the bolt insert hole 46. In the present embodiment, the screw hole 106 is a blind hole.

In the present embodiment, a conical spring washer is used as the elastic member 104. The elastic member 104 is not limited to this, and for example, other types of spring or bush made from rubber or resin having elasticity may be used.

In the exhaust turbo supercharger 101 constructed in this way, between the bolt 48 and the bearing housing 22, the elastic member 104 is provided in a state of being compressed in the axial direction of the bolt 48.

As a result, when a difference occurs between the thermal expansion amounts of the turbine housing 102 and the bolt 104, and the thermal expansion amount of the bearing housing 22, the elastic member 104 returns from its compressed state by this difference amount, thereby compensating for the difference between these thermal expansion amounts. Therefore, a decrease in the fastening force of the bolt 48 is unlikely to occur, so that the contact pressure of the gasket 44 is ensured.

In this exhaust turbo supercharger 101, since a reduction in the fastening force of the bolt 48 is unlikely to occur as described above, thereby ensuring the contact pressure of the gasket 44, the sealing capacity of the gasket 44 can be ensured without setting the fastening force of the bolt 48 high.

Figure 12:
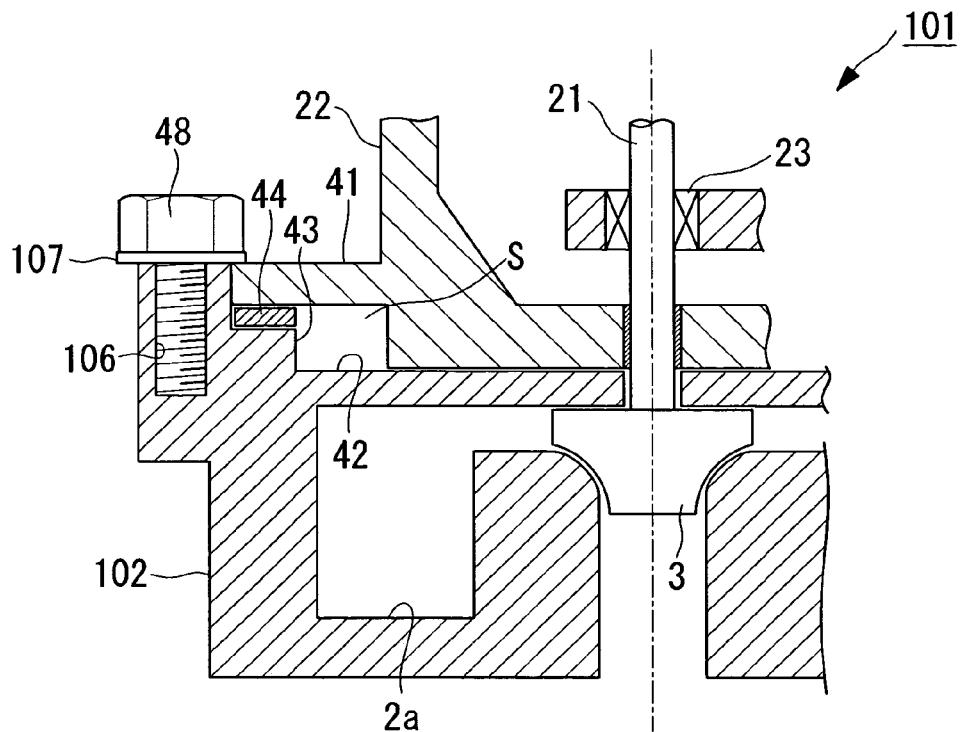
FIG. 12 is a vertical sectional view showing another construction example of an exhaust turbo supercharger according to the seventh embodiment of the present invention.

Here, in the present embodiment, an example of providing the elastic member 104 between the head section of the bolt 48 and the flange section 41 of the bearing housing 22 is shown. However, as shown in FIG. 12, instead of the elastic member 104, a washer 107 made from a material having a thermal expansion coefficient higher than that of the bearing housing 22 may be provided. As the material of the washer 107, for example, Cu (copper) or Cu-base alloy, Al (aluminum) or Al-base alloy, or Mg (magnesium) based alloy may be used.

In this case, even if there is a difference between the thermal expansion amounts of the turbine housing 102 and the bolt 48 and the thermal expansion amount of the bearing housing 22, the difference in their expansion amounts is compensated for by the expansion amount of the washer 107, so that a decrease in the fastening force of the bolt 48 is unlikely to occur, and the contact pressure of the gasket 44 can be ensured.

In this exhaust turbo supercharger 101, since a reduction in the fastening force of the bolt 48 is unlikely to occur as described above, thereby ensuring the contact pressure of the gasket 44, the sealing capacity of the gasket 44 can be ensured without setting the fastening force of the bolt 48 high.

Eighth Embodiment

Figure 13:
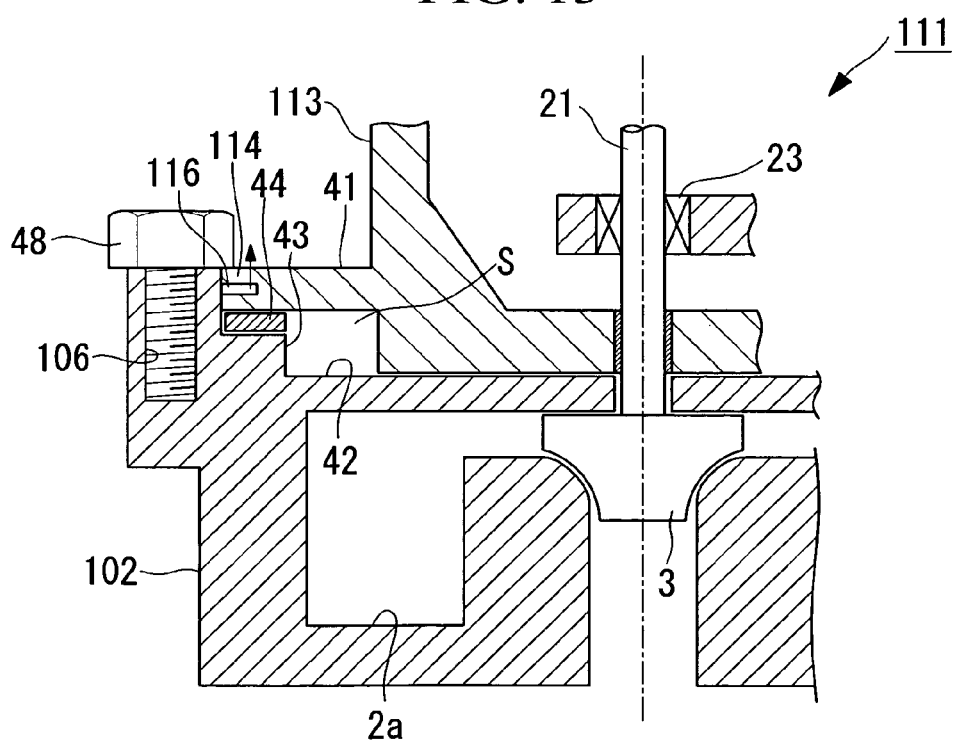
FIG. 13 is a vertical sectional view showing the construction of an exhaust turbo supercharger according to an eighth embodiment of the present invention.

Next, an eighth embodiment of the present invention is described, with reference to FIG. 13.

An exhaust turbo supercharger 111 according to the present embodiment is characterized mainly in that, in the exhaust turbo supercharger 1 as shown in the first embodiment, the turbine housing 102 as shown in the seventh embodiment is used instead of the turbine housing 2, and a bearing housing is used instead of the bearing housing 22. Hereunder, the same reference symbols are assigned to constructions similar to, or the same as, those in the first embodiment, and detailed descriptions thereof are omitted.

The bearing housing 113 is such that a bolt support section 114 that receives the bolt 48 can elastically deform in the axial direction of the bolt 48.

In the present embodiment, the bearing housing 113 has a slit 116 provided at least on the outer circumference surface of the area in the flange section 41 that receives the bolt 48, thereby enabling the bolt support section 114 to be such that the area that receives the bolt 48 of the flange section 41 can elastically deform in the axial direction of the bolt 48.

In a state where the turbine housing 102 and the bearing housing 113 are fixed by the bolt 48, the bolt support section receives the bolt 48 in a state of being elastically deformed to the turbine housing 102 side.

In the exhaust turbo supercharger 111 constructed in this way, the bolt support section 114 of the bearing housing 113 receives the bolt 48 in a state of being elastically deformed to the turbine housing 102 side.

As a result, when a difference occurs between the thermal expansion amounts of the turbine housing 102 and the bolt 48 and the thermal expansion amount of the bearing housing 113, the bolt support section 114 returns by that amount in the direction reducing the amount of its elastic deformation, thereby compensating for the difference between these thermal expansion amounts. Therefore, a decrease in the fastening force of the bolt 48 is unlikely to occur, so that the contact pressure of the gasket 44 is ensured.

In this exhaust turbo supercharger 111, since a reduction in the fastening force of the bolt 48 is unlikely to occur as described above, thereby ensuring the contact pressure of the gasket 44, the sealing capacity of the gasket 44 can be ensured without setting the fastening force of the bolt 48 high.

Ninth Embodiment

Figure 14:
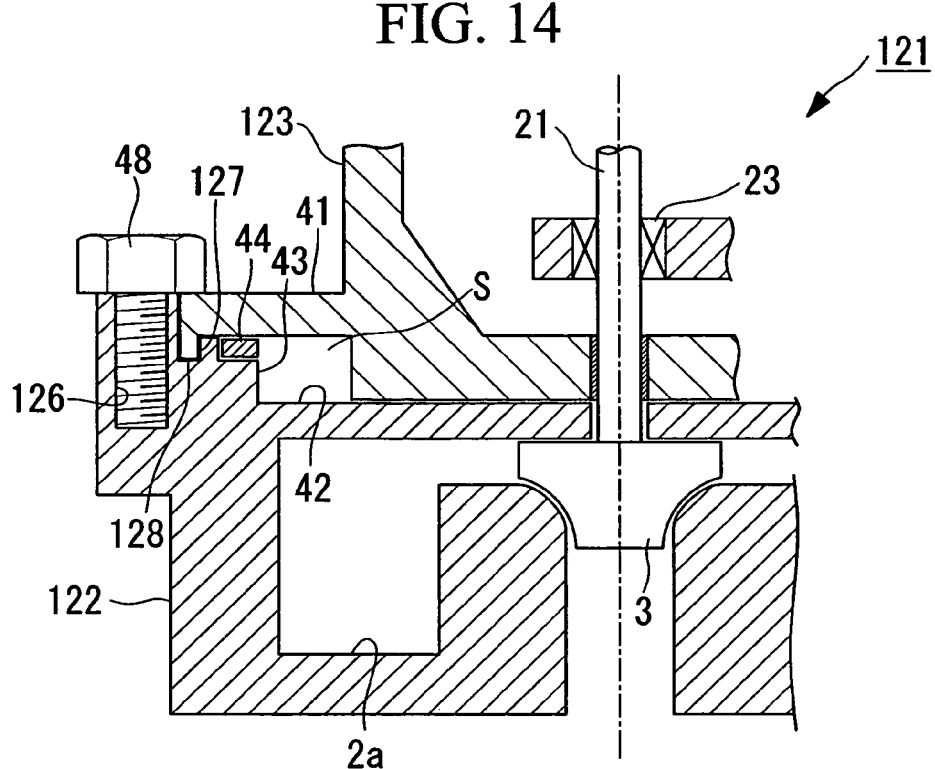
FIG. 14 is a vertical sectional view showing the construction of an exhaust turbo supercharger according to a ninth embodiment of the present invention.

Next, a ninth embodiment of the present invention is described, with reference to FIG. 14.

An exhaust turbo supercharger 121 according to the present embodiment is characterized mainly in that, in the exhaust turbo supercharger 1 as shown in the first embodiment, a turbine housing 122 is used instead of the turbine housing 2, and a bearing housing 123 is used instead of the bearing housing 22. Hereunder, the same reference symbols are assigned to constructions similar to, or the same as, those in the first embodiment, and detailed descriptions thereof are omitted.

The turbine housing 122 is a turbine housing 2 as shown in the first embodiment, in which a screw hole 126 is provided instead of the bolt insert hole 46, and in which there is provided on the step section 43, a cylindrical male engaging section 127 that surrounds the turbine shaft 21. In the present embodiment, the screw hole 126 is a blind hole.

The bearing housing 123 is a bearing housing 22 as shown in the first embodiment, in which, on the side of the flange section 41 facing the step section 43, there is provided a female engaging section 128 into which the male engaging section 127 is inserted, the inner circumference surface of which engages with this male engaging section 127.

The turbine housing 122 and the bearing housing 123 are detachably fixed by the bolt 48, which engages with the screw hole 126 in a state where the male engaging section 127 and the female engaging section 128 are engaged with each other.

In the exhaust turbo supercharger 121 constructed in this way, when temperature of the turbine housing 122 rises, the male engaging section 127 provided in the turbine housing 122 thermal-expands toward the radial direction outside.

On the other hand, since the bearing housing 123 is cooled down by the lubrication mechanism 24 as mentioned above, the thermal expansion amount of the female engaging section 128 provided in the bearing housing 123 toward the radial direction outside is smaller than the thermal expansion amount of the male engaging section 127 toward the radial direction outside. As a result, when the temperature of the turbine housing 122 rises, the outer circumference surface of the male engaging section 127 comes into tight contact with the inner circumference surface of the female engaging section 128, sealing between the turbine housing 122 and the bearing housing 123.

Adhesion between the male engaging section 127 and the female engaging section 128 becomes stronger as the difference between the thermal expansion amounts of the male engaging section 127 and the female engaging section 128 (in other words, the difference between the thermal expansion amounts of the turbine housing 122 and the bearing housing 123) increases, and the sealing property between the turbine housing 122 and the bearing housing 123 becomes more reliable by the amount of this increase.

As a result, even if a difference occurs between the thermal expansion amounts of the turbine housing 122 and the bolt 48, and the bearing housing 123, and the fastening force of the bolt 48 decreases, leakage of exhaust gas from between the turbine housing 122 and the bearing housing 123 is prevented.

Therefore, in this exhaust turbo supercharger 121, the sealing capacity of the gasket 44 can be ensured without setting the fastening force of the bolt 48 higher.

Here, the installation position of the male engaging section 127 in the turbine housing and the installation position of the female engaging section 128 in the bearing housing are arbitrary.

Figure 15:
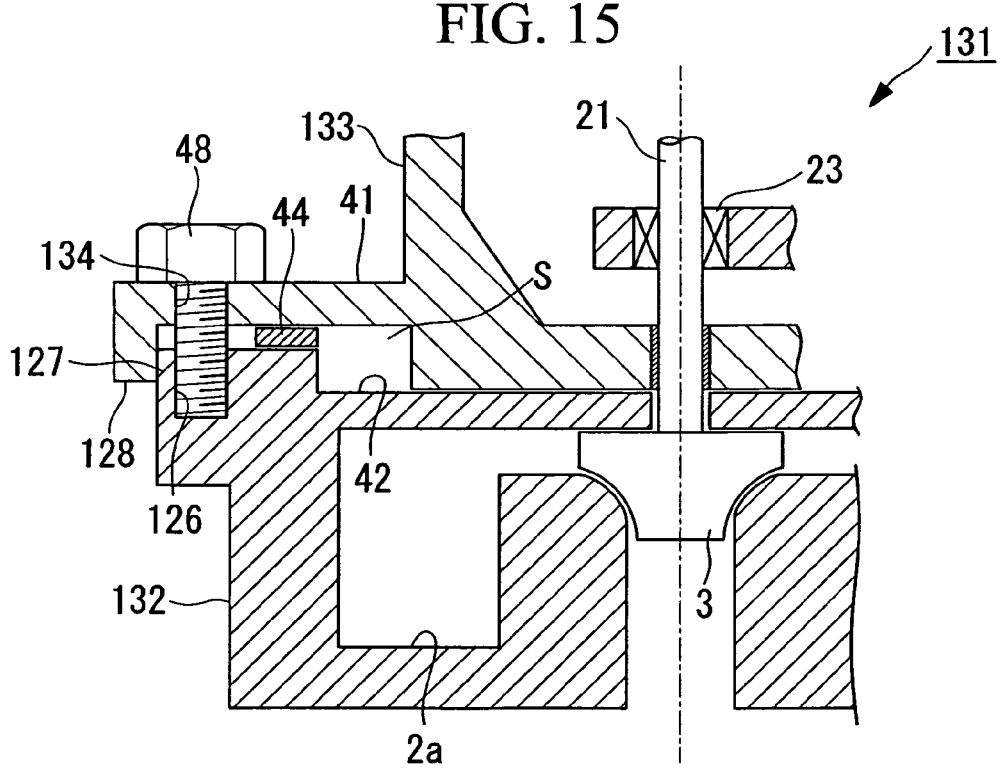
FIG. 15 is a vertical sectional view showing another construction example of an exhaust turbo supercharger according to the ninth embodiment of the present invention.

FIG. 15 shows an exhaust turbo supercharger 131 as an example of an installation form of the male engaging section 127 and the female engaging section 128.

The exhaust turbo supercharger 131 is an exhaust turbo supercharger 121 in which a turbine housing 132 is used instead of the turbine housing 122, and a bearing housing 133 is used instead of the bearing housing 123.

The turbine housing 132 is a turbine housing 122 in which the inner diameter thereof is smaller than the flange section 41 of the bearing housing 133, and the step section 43 is omitted.

In this exhaust turbo supercharger 131, in the turbine housing 132, the gasket 44 is interposed between: the area between the area in which the screw hole 126 is formed and the concave section 42, and the flange section 41 of the bearing housing 133.

In this turbine housing 132, the outer periphery thereof constructs the male engaging section 127.

The bearing housing 133 is a bearing housing 123, in which the flange section 41 is made to project from the outer periphery of the turbine housing 132 toward the radial direction outside, and in which on this flange section 41, there is provided a through hole 134 into which the bolt 48 is inserted, and the female engaging section 128 is provided in the area on the radial direction outside of the outer periphery of the turbine housing 132.

Tenth Embodiment

Figure 16:
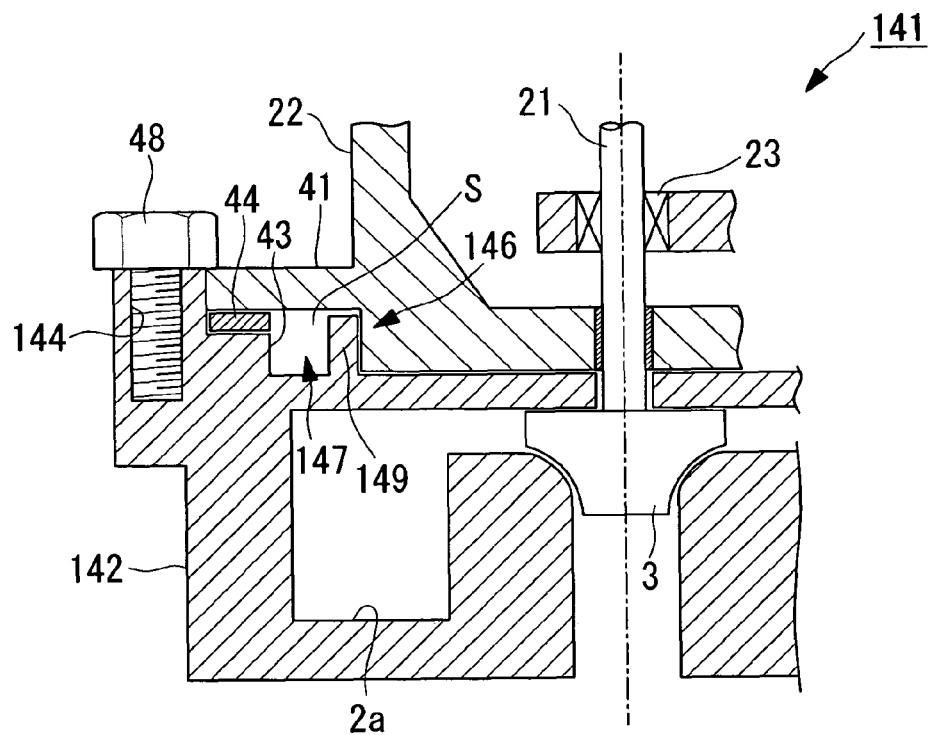
FIG. 16 is a vertical sectional view showing the construction of an exhaust turbo supercharger according to a tenth embodiment of the present invention.

Next, a tenth embodiment of the present invention is described, with reference to FIG. 16.

An exhaust turbo supercharger 141 according to the present embodiment is characterized mainly in that, in the exhaust turbo supercharger 1 as shown in the first embodiment, a turbine housing 142 is used instead of the turbine housing 2. Hereunder, the same reference symbols are assigned to constructions similar to, or the same as, those in the first embodiment, and detailed descriptions thereof are omitted.

Between the turbine housing 142 and the bearing housing 22, toward the radial direction outside of the turbine shaft 21, there are provided, in the following order, a narrow section 146 where the distance between the turbine housing 142 and the bearing housing 22 is short, and an expanded section 147 where the distance between the turbine housing 142 and the bearing housing 22 is greater than in the narrow section 146.

In the present embodiment, the turbine housing 142 has the construction of the turbine housing 2 as shown in the first embodiment, in which a screw hole 144 is provided instead of the bolt insert hole 46, and in the concave section 42 there is provided a substantially cylindrical projection section 149, the tip end of which is inserted into the bearing housing 22.

As a result, the narrow section 146 is formed between the projection section 149 and the tip end of the bearing housing 22, and the expanded section 147 is formed in the area on the radial direction outside of the projection section 149, within the concave section 42.

The narrow section 146 serves as an aperture that reduces the pressure of exhaust gas flowed in from an insertion passage section for the turbine shaft 21 in the turbine housing 142, to between the turbine housing 142 and the bearing housing 22.

The exhaust gas that has passed through the narrow section 146 expands by flowing into the expanded section 147 reducing the pressure thereof.

As described, in this exhaust turbo supercharger 141, the pressure applied by the exhaust gas on the gasket 44 can be low. Therefore, even if a difference in the thermal expansion amounts between the turbine housing 142 and the bolt 48, and the bearing housing 22 occurs, and the fastening force of the bolt 48 decreases, leakage of exhaust gas from between the turbine housing 142 and the bearing housing 22 is prevented.

In particular, in the case where the pressure variation of the exhaust gas is significant, leakage of exhaust gas from between the turbine housing 142 and the bearing housing 22 can be effectively prevented.

Specifically, as the exhaust gas that has entered between the turbine housing 142 and the bearing housing 22 passes through the narrow section 146, a time difference occurs in the pressure variance with the exhaust gas within the turbine housing 142.

As a result, in the expanded section 147, the pressure of the exhaust gas is averaged and the inner pressure of the expanded section 147 becomes lower than the peak pressure of the exhaust gas.

Therefore, in this exhaust turbo supercharger 141, the sealing capacity of the gasket 44 can be ensured without setting the fastening force of the bolt 48 higher.

Eleventh Embodiment

Figure 17:
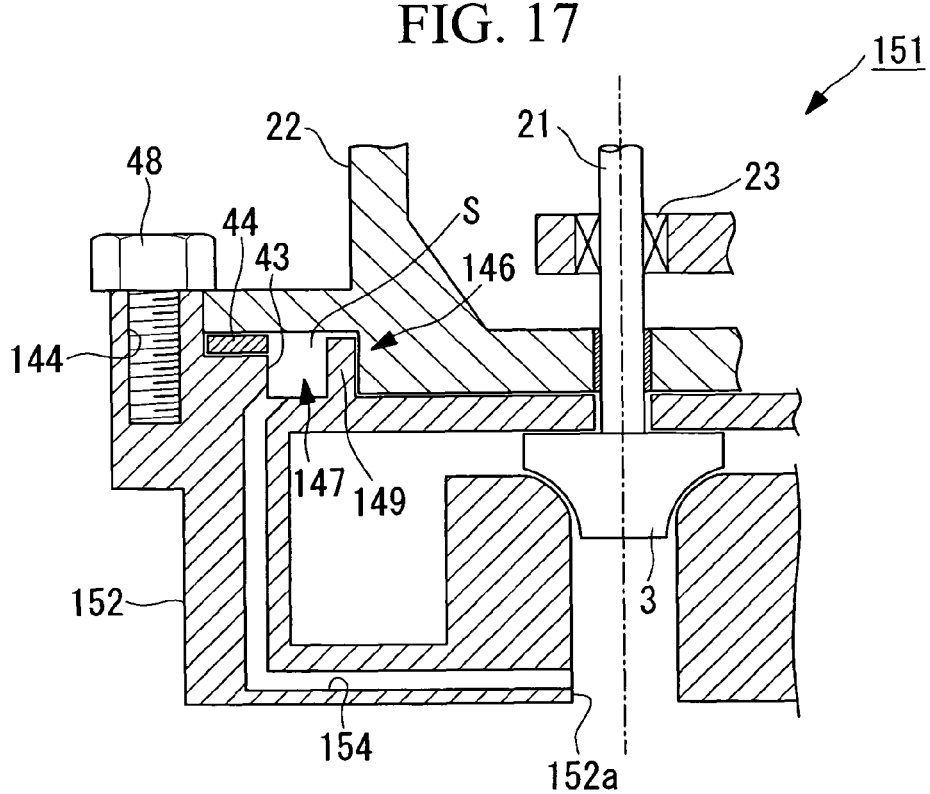
FIG. 17 is a vertical sectional view showing the construction of an exhaust turbo supercharger according to an eleventh embodiment of the present invention.

Next, an eleventh embodiment of the present invention is described, with reference to FIG. 17.

An exhaust turbo supercharger 151 according to the present embodiment is characterized mainly in that, in the exhaust turbo supercharger 141 as shown in the tenth embodiment, a turbine housing 152 is used instead of the turbine housing 142. Hereunder, the same reference symbols are assigned to constructions similar to, or the same as, those in the tenth embodiment, and detailed descriptions thereof are omitted.

The turbine housing 152 is a turbine housing 142 as shown in the tenth embodiment, in which there is provided a bypass flow passage 154 that continues from the expanded section 147 to the vicinity of an exhaust gas exit 152a.

Here, since almost all the energy of the exhaust gas that has been introduced into the turbine housing 152 is consumed in rotation driving the turbine wheel 3, the pressure of the exhaust gas at the exhaust gas exit 152a of the turbine housing 152 is approximately equal to atmospheric pressure.

Therefore, in the case the where the pressure of the exhaust gas within the expanded section 147 is greater than the pressure of the exhaust gas in the vicinity of the exhaust gas exit 152a of the turbine housing 152, the exhaust gas within the expanded section 147 travels through the bypass flow passage 154 and flows into the vicinity of the exhaust gas exit 152a of the turbine housing 152, reducing the inner pressure of the expanded section 147.

Therefore, in this exhaust turbo supercharger 151, the pressure applied by the exhaust gas to the gasket 44 becomes low, and the sealing capacity of the gasket 44 can be ensured.

The invention claimed is:

1. An exhaust turbo supercharger comprising:
a turbine housing, into which exhaust gas from an internal combustion engine is introduced;
a turbine wheel disposed within said turbine housing and being rotatably driven by the exhaust gas;
a turbine shaft having one end inserted into said turbine housing, and having said turbine wheel attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a bolt insert hole is disposed in said turbine housing,
an internal thread insert made from a heat insulating material is disposed in said bolt insert hole, and
said turbine housing and said bearing housing are detachably fixed by a bolt that engages said internal thread insert.

2. An exhaust turbo supercharger comprising:
a turbine housing into which exhaust gas from an internal combustion engine is introduced;
a turbine wheel disposed within said turbine housing and being rotatably driven by the exhaust gas;
a turbine shaft having one end inserted into said turbine housing, and having said turbine wheel attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a through hole having an inner surface is disposed in said turbine housing,
said turbine housing and said bearing housing are detachably fixed by a bolt inserted into said through hole, and a nut that engages said bolt;
and an insert made from a heat insulating material is disposed between the inner surface of said through hole and said bolt.

3. An exhaust turbo supercharger comprising:
a turbine housing into which exhaust gas from an internal combustion engine is introduced;
a turbine wheel disposed within said turbine housing and being rotatably driven by the exhaust gas;
a turbine shaft having one end inserted into said turbine housing, and having said turbine wheel attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a screw hole is disposed in said turbine housing, said screw hole having a bottom;
said turbine housing and said bearing housing are detachably fixed by a bolt that engages said screw hole;
a first through hole is disposed in said bolt along the axis of said bolt; and
a second through hole that is smaller than the screw hole is disposed on said bottom of said screw hole adjacent said first through hole.

4. An exhaust turbo supercharger comprising:
a turbine housing having an inner surface and into which exhaust gas from an internal combustion engine is introduced;
a turbine wheel disposed within said turbine housing and being rotatably driven by the exhaust gas;
a turbine shaft having one end inserted into said turbine housing, and having said turbine attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a screw hole disposed in said turbine housing;
said turbine housing and said bearing housing are detachably fixed by a bolt that engages said screw hole;
on the inner surface of said turbine housing in an area in contact with the exhaust gas, a heat shield layer is disposed; and
an outer shape of said heat shield layer substantially corresponds to an inner surface shape of a spiral flow passage of said turbine housing.

5. An exhaust turbo supercharger comprising:
a turbine housing into which exhaust gas from an internal combustion engine is introduced;
a turbine wheel disposed within said turbine housing and being rotatably driven by the exhaust gas;
a turbine shaft having one end inserted into said turbine housing, and having said turbine wheel attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a screw hole is disposed in said bearing housing;
said turbine housing and said bearing housing are detachably fixed by a bolt that engages said screw hole; and
a space chamber is formed around the entire circumference and is enclosed by a radial inner side of said gasket, the bearing housing, and the turbine housing.

6. An exhaust turbo supercharger comprising:
a turbine housing, into which exhaust gas from an internal combustion engine is introduced;
a turbine wheel disposed within said turbine housing and being rotatably driven by the exhaust gas;
a turbine shaft having one end inserted into said turbine housing, and having said turbine wheel attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a screw hole is disposed in said turbine housing;
said turbine housing and said bearing housing are detachably fixed by a bolt that engages said screw hole;
an elastic member in a state of being compressed in the axial direction of said bolt is disposed between a head section of said bolt and said bearing housing; and
a space chamber is formed around the entire circumference and is enclosed by a radial inner side of said gasket, the bearing housing, and the turbine housing.

7. An exhaust turbo supercharger comprising:
a turbine housing into which exhaust gas from an internal combustion engine is introduced;
a turbine wheel disposed within said turbine housing and being rotatably driven by the exhaust gas;
a turbine shaft having one end inserted into said turbine housing, and having said turbine wheel attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a screw hole is disposed in said turbine housing;
said turbine housing and said bearing housing are detachably fixed by a bolt that engages said screw hole;
in said bearing housing, a bolt support section that receives said bolt is elastically deform in the axial direction of said bolt, and said bolt support section receives said bolt in a state of being elastically deformed to said turbine housing side; and
a space chamber is formed around the entire circumference and is enclosed by a radial inner side of said gasket, the bearing housing, and the turbine housing.

8. An exhaust turbo supercharger comprising:
a turbine housing into which exhaust gas from an internal combustion engine is introduced;
a turbine wheel disposed within said turbine housing and being rotatably driven by the exhaust gas;
a turbine shaft, one end of which is inserted into said turbine housing, and to which said turbine wheel is attached;
a bearing supporting said turbine shaft;
a bearing housing connected to said turbine housing and said bearing housed inside thereof; and
a gasket sealing an area outside in the radial direction of said turbine shaft and between said turbine housing and said bearing housing;
wherein a screw hole is formed in said turbine housing,
a cylindrical male engaging section surrounding said turbine shaft is disposed in said turbine housing,
a female engaging section is disposed in said bearing housing, said male engaging section being inserted into said female engaging section, an inner surface of said female engaging section being fitted together with said male engaging section,
and said turbine housing and said bearing housing are detachably fixed by a bolt that engages said screw hole, in a state where said male engaging section and said female engaging section are fitted together.

9. An exhaust turbo supercharger comprising:
a turbine housing into which exhaust gas from an internal combustion engine is introduced;
a turbine wheel disposed within said turbine housing and being rotatably driven by the exhaust gas;
a turbine shaft having one end inserted into said turbine housing, and having said turbine wheel attached thereto;
a bearing supporting said turbine shaft;
a bearing housing connected to said turbine housing and having said bearing housed inside thereof; and
a gasket sealing an area outside in the radial direction of said turbine shaft and between said turbine housing and said bearing housing;
wherein a screw hole is disposed in said turbine housing,
and disposed in the following order toward the radial direction outside of said turbine shaft between said turbine housing and said bearing housing are:

a narrow section having a predetermined distance between said turbine housing and said bearing housing; and an expanded section having a predetermined distance between two walls of said turbine housing, the predetermined distance of said expanded section being greater than the predetermined distance of said narrow section;

said turbine housing and said bearing housing are detachably fixed by a bolt that engages said screw hole; and in said turbine housing, a bypass flow passage is disposed in said turbine housing, said bypass flow passage connecting the expanded section to an exit of the exhaust gas that is downstream of the turbine wheel.

* * * * *